United States Patent
Thompson

(10) Patent No.: US 6,927,768 B2
(45) Date of Patent: Aug. 9, 2005

(54) THREE DIMENSIONAL DEPTH CUE FOR SELECTED DATA

(75) Inventor: Daniel Lee Thompson, Austin, TX (US)

(73) Assignee: Autodesk, Inc., San Rafael, CA (US)

( * ) Notice: Subject to any disclaimer, the term of this patent is extended or adjusted under 35 U.S.C. 154(b) by 302 days.

(21) Appl. No.: 09/946,655

(22) Filed: Sep. 5, 2001

(65) Prior Publication Data

US 2003/0043145 A1 Mar. 6, 2003

(51) Int. Cl.⁷ .............................................. G06T 15/00
(52) U.S. Cl. ........................................ 345/419; 345/427
(58) Field of Search ................................ 345/419, 427, 345/766, 898, 852, 860

(56) References Cited

U.S. PATENT DOCUMENTS

| 5,671,381 A | * | 9/1997 | Strasnick et al. ........... 345/848 |
| 5,734,806 A | | 3/1998 | Narayanaswami |
| 6,577,330 B1 | * | 6/2003 | Tsuda et al. ................ 345/782 |
| 6,621,509 B1 | * | 9/2003 | Eiref et al. ................. 345/836 |
| 2002/0180734 A1 | * | 12/2002 | Endoh et al. ............... 345/428 |
| 2003/0043209 A1 | * | 3/2003 | Pearson ....................... 345/835 |

FOREIGN PATENT DOCUMENTS

JP    WO 01/43077 A1    6/1999

OTHER PUBLICATIONS

Edwards, Gregory. New Software Makes Eyetracking Viable: You Can Control With Your Eyes, CSLI Stanford University, CSUN 98 Papers http://www.dinf.org/csum_98/csun98_126.htm, pp. 1–5, Mar. 3, 1998.

Russell, Rick. Computer Peripherals: Understanding 3D Display, http://peripherals.about.com/compute/peripherals/library/weekly/aa031801b.htm?iam=dpile . . . , pp. 1–7, 2001.

Russell, Rick. Computer Peripherals: The DTI 3D Monitor, http://peripherals.about.com/compute/peripherals/library/weekly/aa031801a.htm, pp. 1–3, 2001.

Russell, Rick. Computer Peripherals: Should You Buy the DTI 3D Monitor?, http://peripherals.about.com/compute/peripherals/library/weekly/aa031801e.htm, pp. 1–3, 2001.

Russell, Rick. Computer Peripherals: The DTI 3D Monitor in Detail, http://peripherals.about.com/compute/peripherals/library/weekly/aa031801c.htm?iam=dpile . . . , pp. 1–7, 2001.

Russell, Rick. Computer Peripherals: Comparing DTI to the Competition, http://peripherals.about.com/compute/peripherals/library/weekly/aa031801d.htm, pp. 1–5, 2001.

* cited by examiner

Primary Examiner—Kimbinh T. Nguyen
(74) Attorney, Agent, or Firm—Gates & Cooper LLP

(57) ABSTRACT

One or more embodiments of the invention provide a visual cue upon the selection of data in a three-dimensional view. Data is displayed at a first depth in a simulated three-dimensional view on a display device attached to a computer. A user may then select the data or a portion of the data. Once selected, the selected data is displayed at a second depth in the simulated three-dimensional view such that the selected data is distinguishable.

36 Claims, 2 Drawing Sheets

THREE DIMENSIONAL DEPTH CUE FOR SELECTED DATA

CROSS-REFERENCE TO RELATED APPLICATIONS

This application is related to the following co-pending and commonly-assigned patent application, which application is incorporated by reference herein:

U.S. patent application Ser. No. 09/464,557, entitled "VISUAL CLUES TO NAVIGATE THREE-DIMENSIONAL SPACE IN A COMPUTER-IMPLEMENTED GRAPHICS SYSTEM", by Brian D. Gantt, filed on Dec. 16, 1999.

BACKGROUND OF THE INVENTION

1. Field of the Invention

The present invention relates generally to displaying information in three dimensions, and in particular, to a method, apparatus, and article of manufacture for providing three dimensional (3D) depth cues for selected data.

2. Description of the Related Art

In computer applications, graphical user interfaces often display visual cues that indicate the selection of data such as text, lines, graphical objects, etc. Such visual cues assist the user in editing and manipulating the data. In three-dimensional space, it becomes more difficult to indicate that data has been selected. Such problems may be better understood by describing three-dimensional computing and visual cues used in the prior art.

When a computer user is editing data (of a variety of forms), the user will frequently desire to select a particular data object/unit to perform an edit operation on. Some examples include selecting text in a word processing application to under line the text, selecting a line in a drawing program (e.g., Autodesk AutoCAD) to change its color, or selecting a cell in a spreadsheet program to edit/copy. When performing these selections, the computer program provides visual cues/feedback, referred to as highlighting, to the user to identify the data that has been selected. The predominant use of highlighting is to mark selections. However, highlighting can also be used to focus a user's attention on the highlighted data, even if that highlighted data is not going to be edited.

Prior art visual cues and highlighting may take many forms. For example, the data's color may be inverted (e.g., white on black instead of black on white) using an exclusive OR (XOR) operation. Alternatively, the data's color may be brightened, dimmed, or just changed. In yet another alternative, the selected data may be displayed in a bold typeface.

One problem with such prior art techniques is that all of the approaches use visual attributes that are normally available for the data (i.e., attributes available to the data in the data's natural state). For example, text may already be bold or inverted as part of a document. Further, graphical lines may already be many different colors, brightness levels, or opacity in a drawing. Accordingly, the prior art highlighting may not be distinguishable or as distinguishable from the remaining non-selected data as desired.

Further, as graphical user interfaces become more sophisticated with more widespread use of additional available options, the display of highlighting using natural attributes of the data becomes less distinguishable. For example, hardware and software devices may track the movement of a user's eyes and utilize the tracked information to control the application or aspects of the application. Such tracking may utilize many displayable options that must be distinguishable to accurately track eye movement. In another example, hardware and software may simulate the display of information in 3D to provide additional options that may require a mechanism for more easily and clearly distinguishing selected data from other displayed data. To better understand the display of data in 3D, a review of the 3D technology is provided below.

To create a visual sensation of 3D, a two dimensional (2D) display must simulate various elements/attributes of a real 3D scene. Some of these attributes include geometric perspective, aerial perspective, and stereoscopy.

Geometric perspective provides for displaying data smaller and closer together as the data is farther away from the viewer. Geometric perspective is relatively easy to simulate requiring only the correct mathematical algorithms to render a 3D object with correct perspective. 3D accelerators may provide this functionality in typical computers.

An aerial perspective attribute provides for varying the color intensity and contrast for data and objects based on their distance from the user. For example, less intense color and contrast may be displayed for objects that are farther away. Since the colors of most objects are known, the human brain may use a change in color intensity and contrast to create a sensation of depth. Modern 3D accelerators may attempt to simulate aerial perspective using "fog" effects to dim the color intensity of distant surfaces.

A stereoscopy attribute manifests itself by the human brain interpreting differences between images presented to each eye and synthesizing the sensation of depth. Standard 2D computer displays cannot produce stereoscopic images without help. However, newer monitors and other hardware devices may provide such capabilities.

Many new display and hardware systems simulate one or more of the above 3D attributes. For example, a thin layer of special plastic may be placed between a lighted back panel and a LCD (liquid crystal display) of a monitor. Such a layer may be used to direct light rays from the backlight to the left and right eyes to create a stereoscopic view. Using the layer, alternate columns of image pixels are projected into the left and right eyes thereby resulting in two distinct stereoscopic images, one directed at the left eye, and one directed at the right eye. Such a technique provides one image to the right eye and a slightly different one to the left eye to simulate 3D. Other techniques may layer semi-transparent flat display screens. Additional hardware such as shutter glasses contain small LCD panels that cover each eye and images are shuttered between the left and right eye to provide a stereoscopic image.

Accordingly, various techniques and devices may be utilized to simulate three dimensions to a viewer. However, the problem with distinguishing selected data, whether in two dimensions or three dimensions remains. Further, such new techniques and devices are primarily used for modeling 3D data. Such techniques and devices lack the ability to interact with data (including 2D data) in a real-world, 3D fashion.

SUMMARY OF THE INVENTION

One or more embodiments of the invention provide a method, apparatus, and article of manufacture for a depth cue for selected data displayed in a three-dimensional view. Prior art methods for indicating depth merely modify a natural attribute of the data (e.g., inverting the colors or displaying the data in a different color). By using a natural attribute of data, the selection of the data is difficult to distinguish.

One or more embodiments of the invention indicate the selection of data by modifying the depth of the data displayed in a three-dimensional view. For example, a selected line may jump towards the user, selected text or table entries may move towards the user, and/or the depth may be modulated to provide an appearance of the data blinking between two depth values. Thus, data is displayed at a first depth, the data is selected by a user, and the selected data is then displayed at a second depth.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
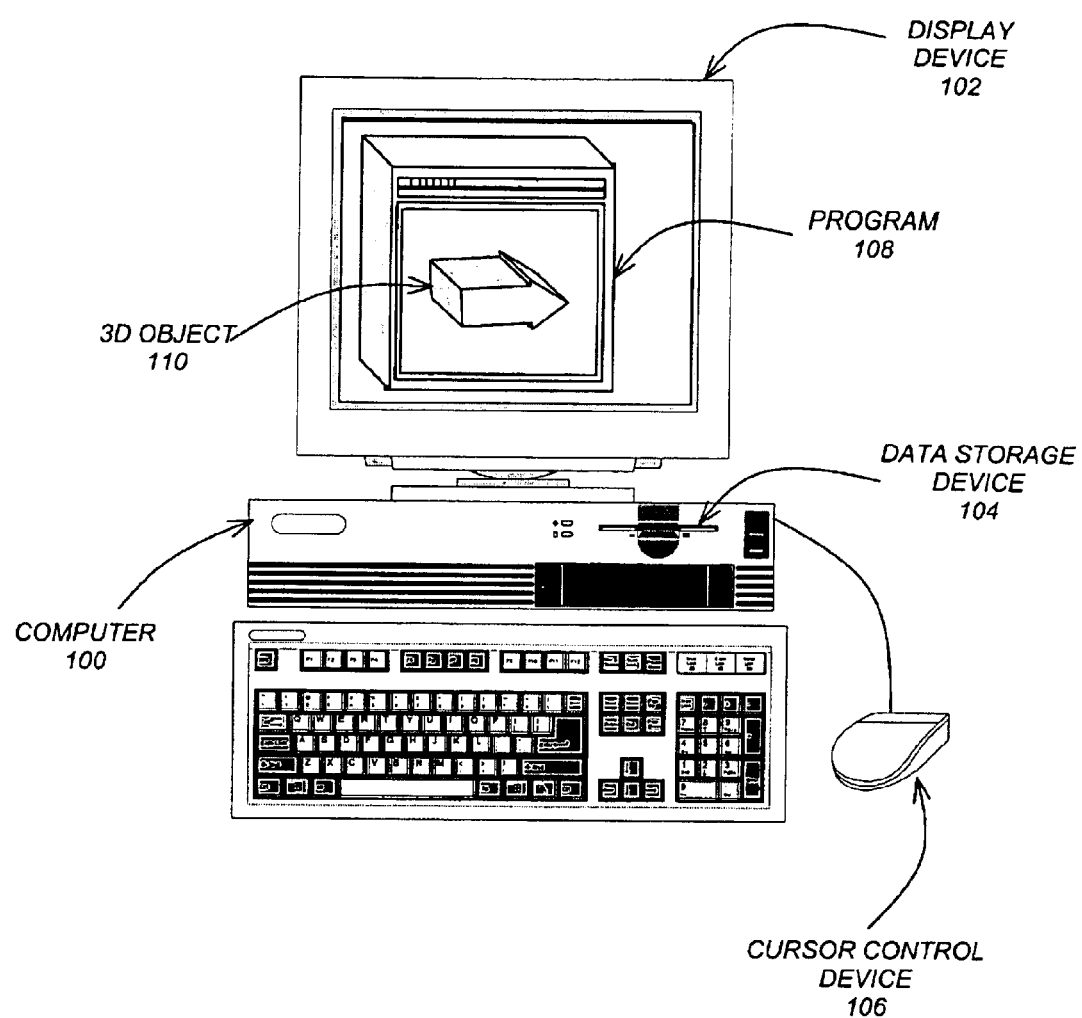
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Data (e.g., text, graphical object [e.g., line, shape, etc.]) is displayed in a simulated three-dimensional view on a display device. The display device may be a particular device configured to display data in 3D. A user interacts with the data and selects the data in the three-dimensional view. Once selected, the invention displays the data at a different depth to indicate the selection and distinguish the selected data from remaining/surrounding data displayed.
Hardware Environment FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Display device 102 may be any mechanism capable of display such as special goggles or glasses, or a monitor as displayed in FIG. 1. Further, display devices 102 may be configured to simulate three-dimensional space (e.g., by simulating a geometric perspective attribute, aerial perspective attribute, or stereoscopy attribute) using either hardware or software. For example, as described in the background, special goggles or an extra layer of a monitor may be used to simulate 3D using the hardware. Those skilled in the art will recognize that any combination of the above components, or any number of different components, peripherals, and other devices, may be used with the computer 100.

One or more embodiments of the invention ate implemented by a computer-implemented program 108 configured to display data (e.g., 3D arrow object 110, text, etc.) in a simulated three-dimensional view, wherein the program 108 is represented by a window displayed on the monitor 102 that may (or may not) also be displayed in three dimensional space. Accordingly, regardless of whether the hardware is a typical 2D display monitor or is specially configured to display data in 3D, program 108 may be used to simulate a 3D environment (e.g., by displaying two images that require the use of 3D glasses). Generally, the program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.
Software Embodiments Many display systems can provide a realistic sense of depth, even from a 2D display. For example, using a 2D display, software program 108 may be configured to simulate a 3D environment by using 3D glasses. Alternatively, the display device hardware (such as a goggles or an additional layer on an LCD display) may be specially configured to simulate 3D without the use of supplemental vision devices such as 3D glasses.

To take advantage of the depth attribute, software executing on such systems may include a depth attribute that is utilized by the system. For example, an additional axis (e.g., Z-axis) for specifying the coordinates and location of data may be utilized (i.e., in addition to the Cartesian X-Y coordinate axis).

In one or more embodiments of the invention, the depth attribute is utilized to indicate when data has been selected (e.g., by a user or by the system). When selected, the depth of the selected data is changed to clearly indicate the selection and distinguish the selected data from remaining/surrounding data. Alternatively, the depth of the data may be animated to indicate the selection.

Variations of the invention may modify the depth of the selected data differently. For example, in one embodiment, the selected data may be displayed at a closer depth than the originally displayed depth. Alternatively, the data may be displayed at the modified depth for a brief period of time. In another embodiment, the depth may be animated wherein data is displayed at depths that modulate between close and far away thereby providing an appearance of blinking. In such an embodiment, the data is first displayed at one depth and then at a second depth. In yet another embodiment, the data may remain at a modified depth while the user completes editing operations.

Specific examples of the use of a modified depth to indicate data selection follow. In a graphics drawing application (e.g., a computer aided design [CAD] program), upon selecting a line in a graphics drawing program the line may jump towards the user for a brief period of time. In word processing, some text may be selected and the depth may be changed such that the text moves towards the user and remains closer for editing. In a spread sheet program (or a program that displays tables), a group of table entries may be selected for editing and the entries may move towards the user for editing. Alternatively, in any of the above specific examples, once data is selected, the depth may modulate between close and far away such that the data appears to be blinking.

By modifying the depth wherein the data is brought forward or appears closer to a user, the data is essentially magnified. Accordingly, instead of peering into the monitor to view a detail, the depth modification in essence magnifies the data. A software tool that is part of the application may also enable the use of such depth modification and resulting magnification by a user. Thus, in addition to clearly distinguishing the data based on the depth, depth modification/animation may allow the user to view the data more easily and at a greater magnification.

Figure 2:
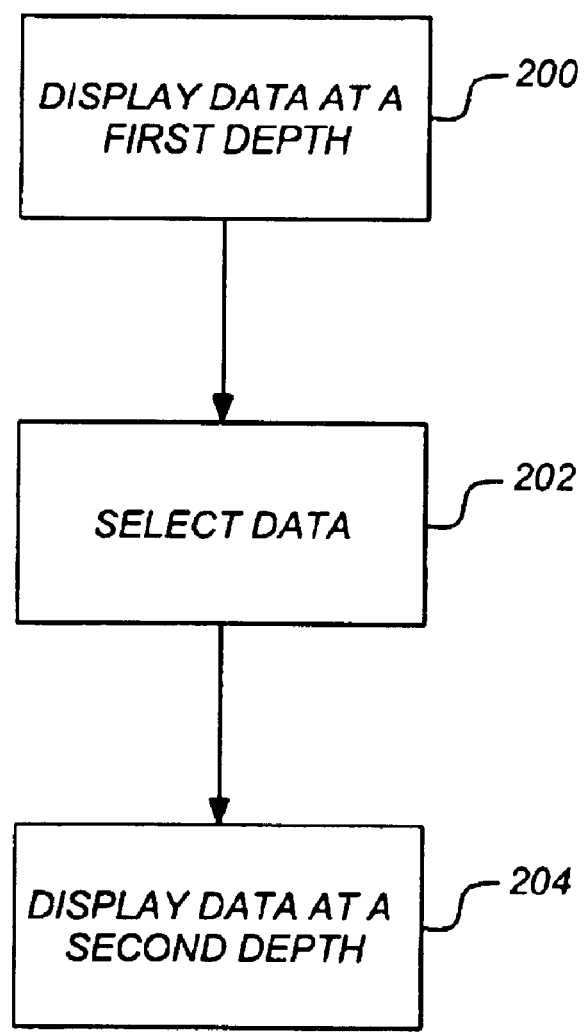
FIG. 2 is a flow chart illustrating depth modification to indicate data selection in accordance with one or more embodiments of the invention.

FIG. 2 is a flow chart illustrating depth modification to indicate data selection in accordance with one or more embodiments of the invention. At step 200, data is displayed at a first depth in a simulated three-dimensional view on a display device. At step 202, the data is selected (e.g., by the user using a cursor control device 106). At step 204, the selected data is displayed at a second depth such that the selected data is distinguishable from remaining/surrounding data. As indicated above, to more clearly distinguish the selected data, the second depth is likely closer to the user than the first depth. Further, step 204 may only be performed for a brief period of time, may modulate between the first and second depth, or may remain at the second depth while the user conducts editing operations.

By using depth to indicate the selection of 2D or 3D data in a 3D simulated view, the invention provides the ability for a user to interact with data in a real-world, three-dimensional fashion. Such interaction may enable a user to mote easily manipulate data in three-dimensional space. Additionally, by displaying data using such visual cues, selected data may be easily distinguishable in a complex or convoluted workspace (e.g., a detailed architectural drawing).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method, apparatus, and article of manufacture for providing visual cues and displaying selected data in a three-dimensional view.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for indicating a selection of data in a simulated three-dimensional view, comprising:

displaying data at a first depth within an application window that simulates the three-dimensional view on a display device attached to a computer;

selecting the data within the application window;

displaying the selected data at a second depth within the application window wherein the selected data is distingushable; and modulate displaying the selected data at the first depth and the second depth to provide an appearance of blinking.

2. The method of claim 1 wherein the second depth is closer to a viewer than the first depth.

3. The method of claim 1 wherein the data comprises text.

4. The method of claim 1 wherein the data comprises a graphical object.

5. The method of claim 1 wherein the data comprises a spreadsheet table.

6. The method of claim 1 wherein the data selected comprises an entry from a table.

7. An apparatus for indicating a selection of data in a computer-simulated three-dimensional view:

(a) a computer system;

(b) a display device coupled to the computer system; and (c) one or more computer programs represented by an application window displayed on the display devicem, performed by the computer, for:

(i) displaying data at a first depth within the application window that simulates the three-dimensional view;

(ii) selecting the data within the application window;

(iii) displaying the data at a second depth within the application window wherein the selected data is distinguishable; and (iv) modulate displaying the selected data at the first depth and the second depth to provide an appearance of blinking.

8. The apparatus of claim 7 wherein the second depth is closer to a viewer than the first depth.

9. The apparatus of claim 7 wherein the data comprises text.

10. The apparatus of claim 7 wherein the data comprises a graphical object.

11. The apparatus of claim 7 wherein the data comprises a spreadsheet table.

12. The apparatus of claim 7 wherein the data selected comprises an entry from a table.

13. An article of manufacture comprising a program storage medium readable by a computer and embodying one or more instructions executable by the computer to perform a method for indicating a selection of data in a simulated three-dimensional view, the method comprising:

displaying data at a first depth within an application window that simulates the three-dimensional view on a display device attached to a computer;

selecting the data within the application window;

displaying the selected data at a second depth within the application window wherein the selected data is distinguishable; and modulate displaying the selected data at the first depth and the second depth to provide an appearance of blinking.

14. The article of manufacture of claim 13 wherein the second depth is closer to a viewer than the first depth.

15. The article of manufacture of claim 13 wherein the data comprises text.

16. The article of manufacture of claim 13 wherein the data comprises a graphical object.

17. The article of manufacture of claim 13 wherein the data comprises a spreadsheet table.

18. The article of manufacture of claim 13 wherein the data selected comprises an entry from a table.

19. A computer-implemented method for indicating a selection of data in a simulated three-dimensional view, comprising:

displaying data at a first depth within an application window that simulates the three-dimensional view on a display device attached to a computer;

selecting the data within the application window;

displaying the selected data at a second depth within the application window wherein the selected data is distinguishable; and temporarily maintaining the data at the second depth while performing an editing operation on the selected data, wherein the selected data is temporarily displayed at the second depth to provide easier viewing and greater magnification of the selected data during editing.

20. The method of claim 19 wherein the second depth is closer to a viewer than the first depth.

21. The method of claim 19 wherein the data comprises text.

22. The method of claim 19 wherein the data comprises a graphical object.

23. The method of claim 19 wherein the data comprises a spreadsheet table.

24. The method of claim 19 wherein the data selected comprises an entry from a table.

25. An apparatus for indicating a selection of data in a computer-simulated three-dimensional view:

(a) a computer system;

(b) a display device coupled to the computer system; and (c) one or more computer programs represented by an application window displayed on the display device, performed by the computer, for:
  (i) displaying data at a first depth within the application window that simulates the three-dimensional view;
  (ii) selecting the data within the application window;
  (iii) displaying the data at a second depth within the application window wherein the selected data is distinguishable; and
  (iv) temporarily maintaining the data at the second depth while performing an editing operation on the selected data, wherein the selected data is temporarily displayed at the second depth to provide easier viewing and greater magnification of the selected data during editing.

26. The apparatus of claim 25 wherein the second depth is closer to a viewer than the first depth.

27. The apparatus of claim 25 wherein the data comprises text.

28. The apparatus of claim 25 wherein the data comprises a graphical object.

29. The apparatus of claim 25 wherein the data comprises a spreadsheet table.

30. The apparatus of claim 25 wherein the data selected comprises an entry from a table.

31. An article of manufacture comprising a program storage medium readable by a computer and embodying one or more instructions executable by the computer to perform a method for indicating a selection of data in a simulated three-dimensional view, the method comprising:

displaying data at a first depth within an application window that simulates the three-dimensional view on a display device attached to a computer;

selecting the data within the application window;

displaying the selected data at a second depth within the application window wherein the selected data is distinguishable; and temporarily maintaining the data at the second depth while performing an editing operation on the selected data, wherein the selected data is temporarily displayed at the second depth to provide easier viewing and greater magnification of the selected data during editing.

32. The article of manufacture of claim 31 wherein the second depth is closer to a viewer than the first depth.

33. The article of manufacture of claim 31 wherein the data comprises text.

34. The article of manufacture of claim 31 wherein the data comprises a graphical object.

35. The article of manufacture of claim 31 wherein the data comprises a spreadsheet table.

36. The article of manufacture of claim 31 wherein the data selected comprises an entry from a table.

* * * * *